United States Patent [19]

Saunders

[11] 4,201,189
[45] May 6, 1980

[54] CURTAIN ASSEMBLY

[76] Inventor: Norman B. Saunders, 15 Ellis Rd., Weston, Mass. 02193

[21] Appl. No.: 957,744

[22] Filed: Nov. 6, 1978

Related U.S. Application Data

[60] Continuation of Ser. No. 795,101, May 9, 1977, abandoned, which is a division of Ser. No. 607,568, Aug. 25, 1975, abandoned, which is a division of Ser. No. 529,235, Dec. 3, 1974, Pat. No. 3,952,947.

[51] Int. Cl.² .................................................. F24J 3/02
[52] U.S. Cl. .................................. 126/429; 160/241; 160/310; 160/304 A; 126/419
[58] Field of Search ............... 126/270, 271; 237/1 A; 160/241, 304 R, 310, 304 A; 250/201, 229; 350/119

[56] References Cited

U.S. PATENT DOCUMENTS

| 2,599,141 | 6/1952 | Taylor | 126/270 |
| 3,236,290 | 2/1966 | Lueder | 160/310 |
| 3,243,117 | 3/1966 | Morgan | 126/270 |
| 3,363,666 | 1/1968 | Hodgson et al. | 160/238 |
| 3,832,992 | 9/1974 | Trombe et al. | 126/270 |
| 3,960,135 | 6/1976 | Angilletta | 126/270 |

OTHER PUBLICATIONS

R. W. Bliss, Jr., "Fully Solar-Heated House", Air Conditioning, Heating and Ventilating, Oct. 1955, pp. 92–97.

Primary Examiner—James C. Yeung
Attorney, Agent, or Firm—Schiller & Pandiscio

[57] ABSTRACT

An improved curtain assembly which comprises a cellophane sheet including small grains of a material which are absorptive to light and sun energy and reflective to heat provided in the building.

6 Claims, 8 Drawing Figures

CURTAIN ASSEMBLY

This application is continuation of U.S. Ser. No. 795,101, filed May 9, 1977 and now abandoned, which in turn is a divisional application of U.S. Ser. No. 607,568 filed Aug. 25, 1975, now abandoned, which in turn is a divisional application of U.S. Ser. No. 529,235 filed Dec. 3, 1974, now U.S. Pat. No. 3,952,947 issued Apr. 27, 1976.

This invention relates to the heating and ventilation systems and more specifically, to a system for naturally controlling the temperature and humidity within an enclosed building.

With the advent of the energy crisis, serious efforts are now being made to harness solar energy or "insolation", i.e. energy received from the sun. As a result, various systems have been developed, such as specially designed glazed windows for absorbing the sun's energy, and reradiating it into the building structure. Many of these systems, however, are highly inefficient since the window itself becomes hot resulting in energy loss through the window. Another disadvantage of many of these glazed window systems is that heat is only provided so long as the sun is shining. Further, glazed windows usually form a closed system, and thus separate ventilation and humidification systems must be provided. This is psychologically displeasing to the occupants of the building, since many of these separate ventilation systems do not always provide fresh air but merely recirculate it.

Another type of system which is generally known employs water as a heat absorber and carrier. The water can absorb heat by either flowing over a directly-exposed sloping roof (which may be heat reflective); or by flowing adjacent heat collectors, the latter absorbing heat energy from the sun and transferring or reradiating energy in order to heat the water. Many of the water systems, however, suffer from some of the same disadvantages as the glazed window systems mentioned above.

A third type of system generally known, employs photovoltaic cells which generally provide electromagnetic forces when directly exposed to the sun's energy. These photovoltaic cells are relatively expensive and thus this type of system is at this time not commercially acceptable.

Accordingly, an object of the present invention is to overcome the above-noted disadvantages.

Another object of the present invention is to provide a combined system for not only controlling the temperature in an enclosed building but also for controlling the ventilation, illumination, humidity and privacy within the building.

Yet another object of the present invention is to provide a system for automatically controlling the net energy flow through a window of an enclosed building.

Still other objects of the present invention are to provide a system which stores a portion of the solar energy or insolation and releases it when temperatures within the building drop; a system which circulates exterior air through the window unit and the surrounding ground to raise the interior temperature; and a system which circulates exterior air through the ground to raise the relative humidity of the air introduced into the structure.

These and other objects are achieved by a system which comprises a double glazed window, means for measuring the net energy flow through the window; and means for automatically adjusting the energy flow through the window responsively to seasonal, as well as weather conditions. Portions of the building are utilized as heat sinks and delays for storing a portion of the solar energy so that it can be released when the temperature drops in the building. The system also includes ventilation and humidification means for circulating and humidifying exterior air drawn into the building.

Other objects of the invention will in part be obvious and will in part appear hereinafter. The invention accordingly comprises the apparatus possessing the construction, combination of elements, and arrangement of parts which are exemplified in the following detailed disclosure, and the scope of the application of which will be indicated in the claims.

For a fuller understanding of the nature and objects of the present invention, reference should be had to the following detailed description taken in connection with the accompanying drawings wherein.

Figure 1:
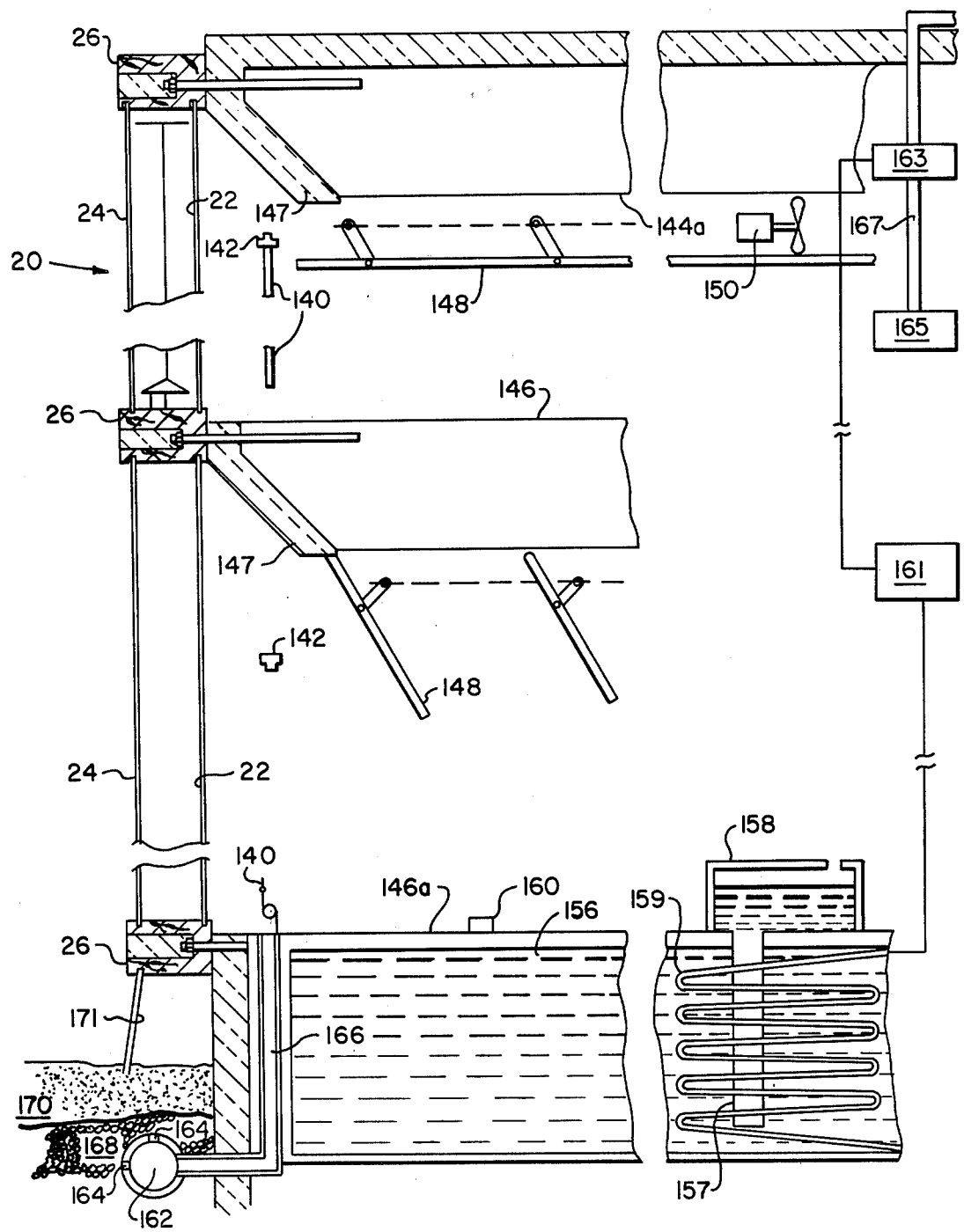
FIG. 1 shows a partial schematic and partial vertical crosssection through the wall of the building which is exposed to solar radiation which is constructed in accordance with the teachings of the present invention.
Figure 3:
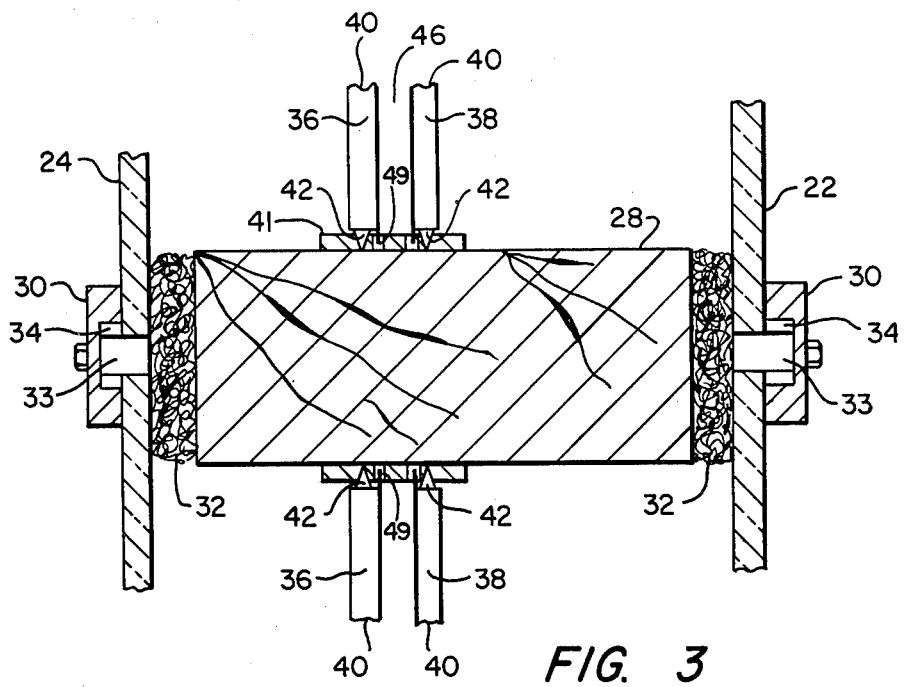
FIG. 3 shows an enlarged fragmentary horizontal cross-sectional view of the window of FIG. 2.
Figure 4:
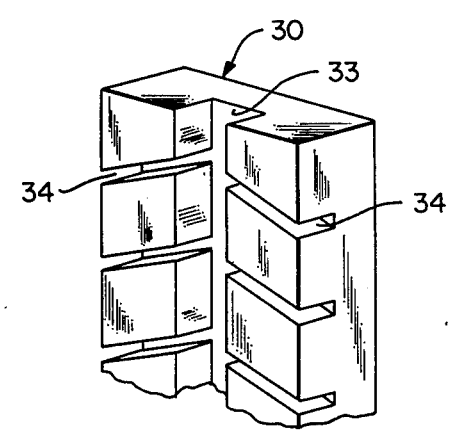
FIG. 4 shows a fragmentary, perspective view of a portion of the embodiment of the window of FIG. 2.

In the drawings, like numerals refer to like parts. FIG. 1 shows the wall of building 20 which is exposed to solar radiation. Although the building 20 is shown as a multi-story structure, the invention may be also employed in single-story buildings. The wall of building 20 comprises windows having an inner glazed panel 22 and an outer glazed panel 24. Both panels are made of material which is transmissive to both light and near infrared heat energy, and opaque to middle and far infrared heat energy, such as glass or the like. The panels are preferably sealed in place at their top and bottom edges in the heat insulated sills 26 in a manner well known in the art. As shown further in FIG. 3, the side edges of the panels are secured to mullions 28 by battens 30. When supported to the mullions 28, the adjacent vertical edges of the panels will be slightly spaced from one another as well as from the column. This space is provided with an air filtering material 32, such as glass wool or the like. The density of the material 32 is dependent on the desired ventilation or air flow rate through the windows as will be more evident hereinafter. As shown in greater detail in FIG. 4, each batten 30 is provided with a vertically-directed groove 33 and a plurality of slots 34 which provide air passages from outside the window to the material 32. The vertically-directed groove 33 of each batten is disposed between the space provided between the adjacent vertical edges of adjacent glazed panels, while the slots are disposed adjacent the surface of the glazed panel and communicate are one end with the groove 33 and at the other end with a vertical side edge of the batten. The slots are oriented or inclined at an angle so that the end of each of the slots communicating with the groove 33 is higher than the end of the slots along the vertical edge of the batten. The batten thus provides an equal restraining force along the edges of the panel and are constructed to allow air, but prevent rain and snow from entering and leaving each window through the slots 34.

Figure 2:
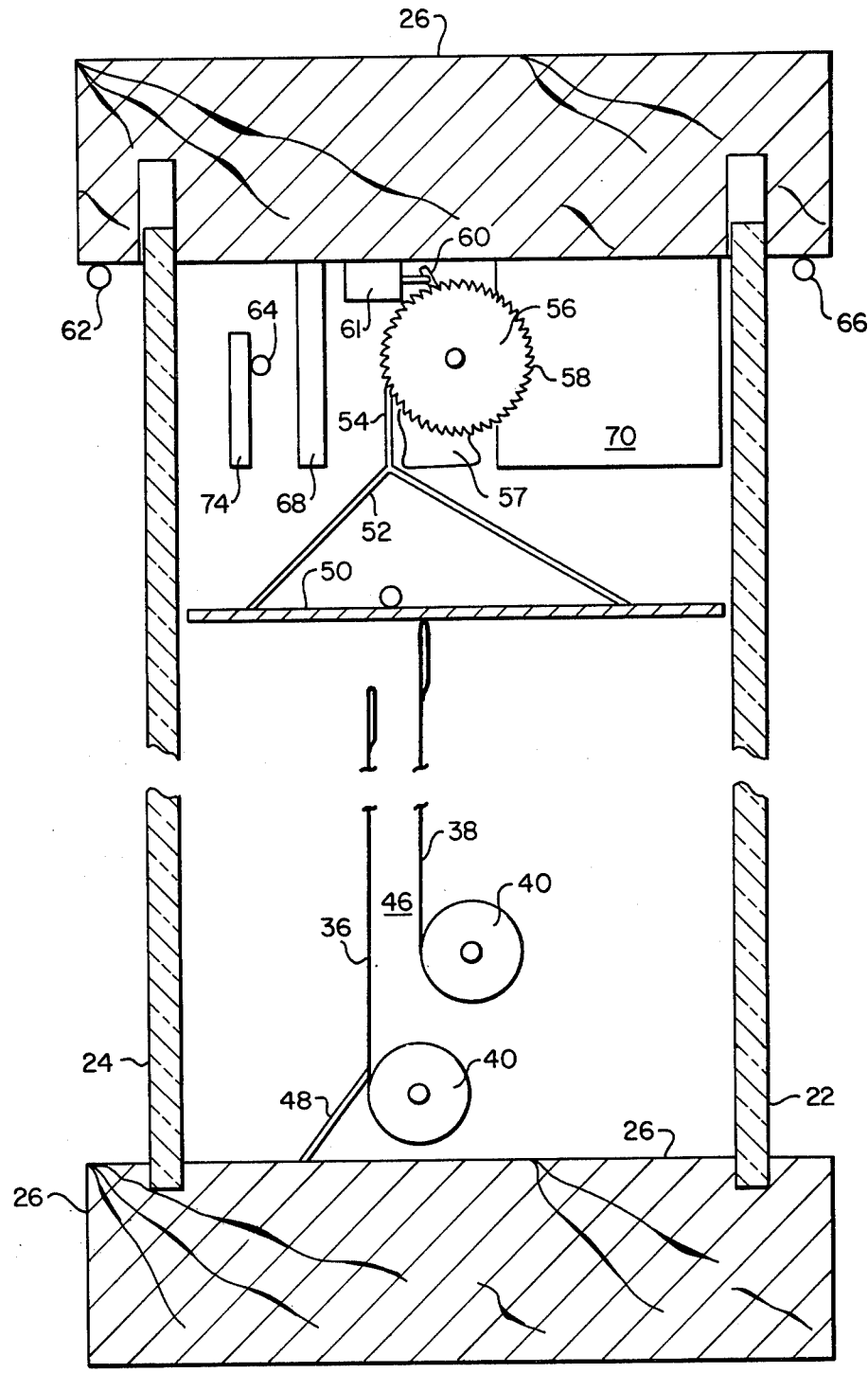
FIG. 2 shows a partial schematic and partial enlarged vertical cross-sectional view through an embodiment of a window constructed in accordance with the teachings of the present invention.

Referring again to FIGS. 2 and 3, each window also includes a pair of flexible foils 36 and 38 which are mounted for vertical movement between the panels 22 and 24. The foils are preferably made of a material which is flexible and which reflects the visible and substantially all infrared portions of the electromagnetic spectrum. For example, the foils can be a thin layer of aluminum deposited on one side of a film of polyethylene terephthalate commercially available from E. I. duPont de Nemours & Co., Inc. of Wilmington, Delaware under the trademark, Mylar ®. Each foil is mounted on a spring biased roller 40 so that when no counter restraining forces are applied to the end of the particular foil, the roller will rotate and the foil will wind onto the roller. The rollers are provided with suitable pivot pins 42 at each end so that they can be mounted directly to the mullions 28 or in the plates 41 provided on the mullions, to rotate about horizontal axes between adjacent columns. The roller 40 which is associated with the inside foil 38 is positioned inside of and above the roller associated with the outside foil 36. An air space 46 is thus provided between the foils 36 and 38. Means such as flap 48 may be utilized to substantially seal off any space which may be provided between the lower roller 40 and the lower sill 26. The vertical edges of each foil ride in slots 49 which are provided in the plate 41 and in the absence of plate 41, in the mullions 28. Slots 49 are very narrow, and, for example, are less than a tenth of a millimeter wide.

The top edges of each foil are attached to the flat plate 50 so that the top edge of the front foil 36 is spaced therefrom while the top edge of foil 38 is attached to plate 50 so that it substantially contacts the plate. Plate 50 is mounted in substantially a horizontal plane and is adapted to vertically slide between the panels 22 and 24. The plate is dimensioned so that its edges are very close to the panels 22 and 24 so as to substantially seal the area above the plate from the area below the plate. In order to affect the vertical sliding movement of the plate 50, the upper surface of the latter is attached to a frame or yoke 52, which in turn is secured to one end of cord 54. Cord 54 is attached to drum 56 which is rotatably driven by motor 57. One end of the drum 56 is provided with a ratchet gear 58. The latter cooperates with ratchet pin 60, the position of which is controlled by solenoid 61. Solenoid 61 is controlled by the output of logic 68 which is in turn controlled by the temperature sensing elements 62, 64 and 66. The latter are preferably temperature sensing diodes which are well known to those skilled in the art. Element 62 is positioned outside the building, preferably adjacent to outer panel 24 in order to sense the exterior temperature. Element 64 is positioned between the panels 22 and 24 in order to measure the temperature of a black body receiving insolation within the window. Finally, element 66 is positioned inside the building, preferably adjacent to inner panel 22. Sensing elements 62, 64 and 66 each provide an output signal which is a function of temperature of the air surrounding the sensing element. The output signals are applied to the logic card 68 which controls the motor 57 and solenoid 61 which in turn control the position of the plate 50 and thus whether the foils 36 and 38 are in an extended or retracted position. A DC battery 70 is provided to supply voltage for the system. Photovoltaic cells 74, which generate an electromagnetic force when radiant energy falls thereon, may be provided in order to charge the battery 70. Although logic 68 and battery 70 are shown and described as being positioned in the top of the window between panels 22 and 24, it will be appreciated that the logic and battery could be located elsewhere.

Figure 5:
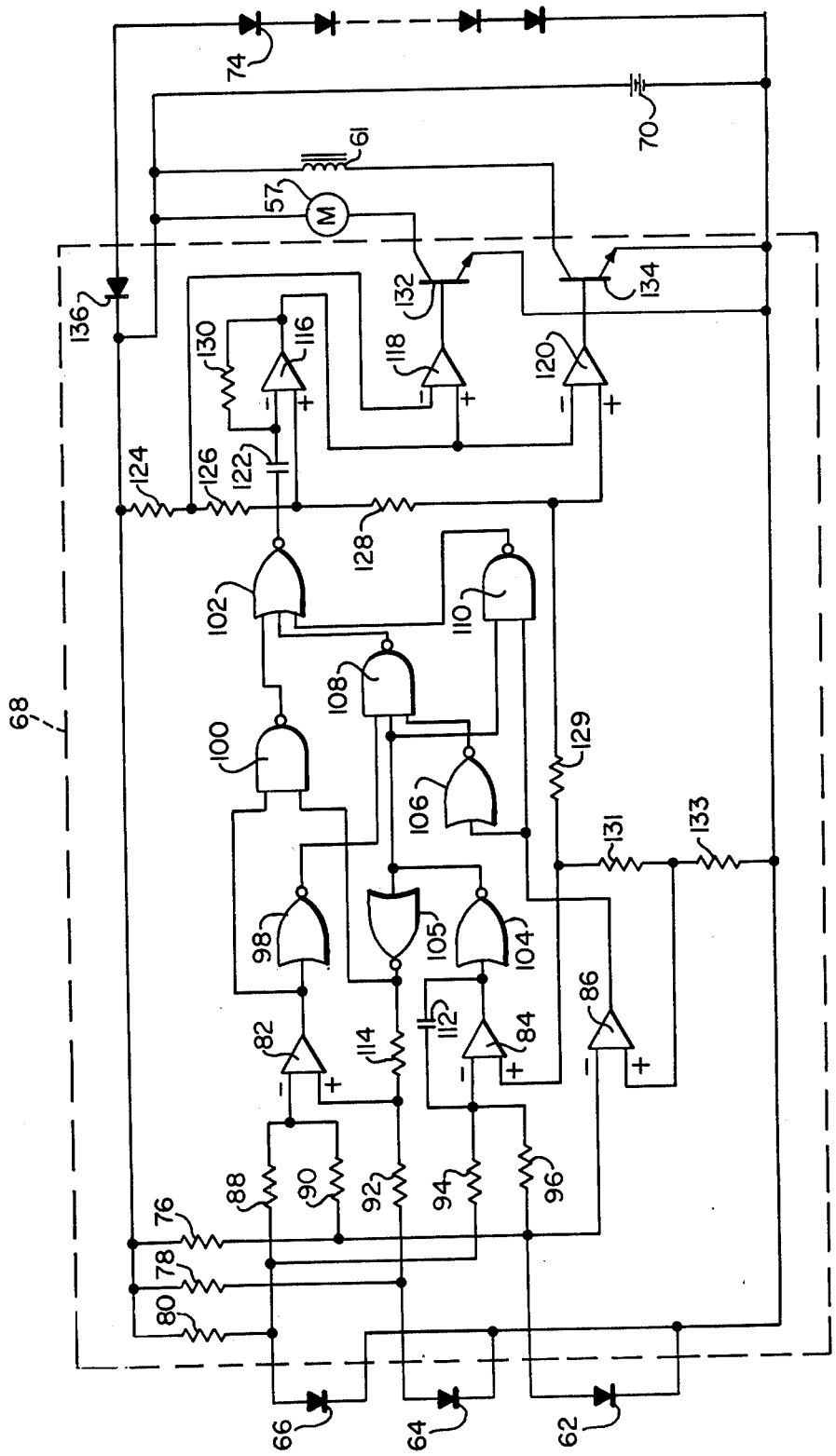
FIG. 5 shows in schematic, a servocontrol system which can be used with the window of FIG. 2.

Referring to FIG. 5, wherein the servocontrol system for raising and lowering the foils 36 and 38 is shown in greater detail, sensing elements 62, 64 and 66 each have their anodes connected to the positive terminal of the battery 70 through the respective current resistors 76, 78 and 80; and their cathodes directly to the negative terminal of battery 70. It will be appreciated that the potential across each sensing element 62, 64 and 66 will thus vary inversely with the temperature sensed by it. The junction of the anodes of element 62 and resistor 76 is connected to the negative or inverting input terminal of the operational amplifier 82 through resistor 90, to the negative or inverting input of the operational amplifier 84 through resistor 96; and directly to the negative or inverting input of differential amplifier 86. The junction of the anode of sensing element 64 and resistor 78 is connected to the positive or direct input terminal of amplifier 82 through resistor 92. The junction of the anode of sensing element 66 and resistor 80 is connected through resistor 88 to the inverting input of amplifier 82 and the inverting input of amplifier 84 through resistor 94. Operational amplifiers 82, 84 and 86 are of a type well known in the art and provide a positive DC potential output when the potential at the positive or direct input terminal exceeds the potential at the negative or inverting input terminal. Conversely, the output of the amplifiers will drop to zero or a low logic output when the potential at inverting input terminal exceeds the potential at the direct input terminal.

The output of the amplifier 82 is connected to an input of each of the inverter 98 and NAND gate 100. The output of amplifier 84 is connected to an input of inverter 104 and is capacitively coupled to its own inverting input through the feedback capacitor 112. The output of amplifier 86 is directly connected to the input of inverter 106 and NAND gate 110. The output of inverter 98 is directly connected to an input of NAND gate 108; the output of inverter 104 is connected to the input of inverter 105 and NAND gates 108 and 110; and the output of inverter 105 is connected to resistor 114 which in turn is connected to the direct input terminal of the amplifier 82. The output of inverter 105 is also connected directly to an input of NAND gate 100. The output of the inverter 106 is connected to an input of NAND gate 108. The output of NAND gates 100, 108 and 110 are each connected to an input of NAND gate 102. As well known, each of the inverting gates 98, 104, 105 and 106 will provide a positive DC potential or high logic output so long as the input to the gate is low. If, however, the input receives a high signal, it will cause the output of the inverting gate to go low. The NAND gates 100, 102, 108 and 110 will each provide a high DC potential or logic null output if any of its inputs is of a low DC potential or logical null. If, however, all the inputs to the NAND gate are of a high DC potential or logical mark, the output will go to a low DC potential or logical mark, as well known in the art.

The output of the gate 102 is capacitively coupled to the negative or inverting input terminal of the operational amplifier 116 through the capacitor 122. The positive or direct input terminal of the operation amplifier 116 is connected to the positive terminal of the battery 70 through resistors 124 and 126 and to the negative terminal of the battery through resistors 128, 129, 131 and 133. The positive or direct input terminal of the operational amplifier 120 is connected to the junction of resistors 128 and 129. The junction of resistors 124 and 126 is connected to the negative or inverting input terminal of the operational amplifier 118. The junction of resistors 129 and 131 is connected to the positive input terminal of the amplifier 84. The junction of resistor 131 and the direct input terminal of amplifier 86 is connected to the negative terminal of battery 70 through the resistor 133. The output of amplifier 116 is tied to its negative or inverting input through feedback resistor 130, and directly connected to the positive input terminal of the operational amplifier 118 and the negative or inverting input of the operational amplifier 120. The output of the amplifier 118 is connected to the base of switching transistor 132. The output of the amplifier 120 is connected to the base of switching transistor 134.

The emitters of the transistors 132 and 134 are both directly connected to the negative terminal of battery 70 while their collectors are connected to the positive terminal of the battery through the motor 57 and the solenoid 61, respectively. As shown, battery 70 is charged by a plurality of photovoltaic cells 74 through the back current limiting diode 136. The latter has its cathode connected to the positive terminal of the battery 70, and its anode connected to the anode end of the plurality of photovoltaic cells 74.

Referring again to FIG. 1, as will be more evident hereinafter, during the winter months when the temperature is below some predetermined value, the foils are usually drawn or closed at night in order to conserve heat within the building. The foils are also drawn during warm summer days in order to reflect insolation. The building may also include curtains 140 which may be provided if privacy is desired. Curtains 140 are supported in any suitable manner such as by curtain rod 142 so that they are spaced from the interior ceiling 144, panel 22, and floor 146. Curtains 140 are spaced from the inner surface of panel 22 so that air along the surface will be stagnant, moving generally in neither an upward or downward direction when winter insolation is striking the curtain. For example, for standard eight foot high curtains, the latter are spaced from the panel 22 about 0.1 meters. The rod 142 is spaced from the ceiling a distance depending on how much top lighting is desired. The spacing at the bottom of the curtain and the floor is made approximately half the spacing to the panel 22 in order to provide a path for circulating air. It is noted that the curtain, when used on a wall minimally exposed to solar energy, may extend all the way to the floor in order to help keep the heat within the building. Curtains 140 preferably should be made of material which is opaque and absorptive to the visible and near infrared portion of the spectrum, but transparent or reflecting to all other infrared, (i.e. heat in the building). For example, cellophane or other completely transmissive sheets containing small grains of silicon, germanium, thallium bromide-iodide or similar materials opaque in the visible and near infrared but transmissive and highly reflective to all other infrared are satisfactory. An example of the dimensions of a finished sheet would be a sheet having an overall thickness of between 25 and 100 micrometers and the grains from 5 to 25 micrometers in diameter. The floors 146 and ceiling 144 preferably are made of material which has a high heat capacity and heat conductivity, such as concrete or the like. Where the floor is covered, such a covering must be made of a thin and high thermally conductive material. The floors and ceilings are well insulated from the sills 26 in a manner well known in the art. The portion 147 of the ceiling adjacent the window is inclined at an angle, e.g. 45° and is preferably heat reflective. Insulating panels 148 are pivotally supported from each ceiling 144 so that in a closed position they form a duct therebetween, and in an open position, expose the ceiling to the interior rooms. The panels may be made of any heat insulating material such as foamed polystyrene or the like, and preferably are surfaced to be reflective to the full infrared spectrum. A fan 150 which may be thermostatically controlled is placed between the panels 148 and each ceiling 144 so as to draw air from interior portion of the building near the window through the building and circulate the air therein as will be described in greater detail hereinafter. This is particularly desirable when the building is provided with interior partitions.

In the preferred embodiment a thermal delay and heat sink is incorporated into the building structure for storing a portion of the sun's energy so that this energy can be released at a later time into the building.

The thermal delay and heat sink are in part provided by the intermediate concrete floor slabs. For example, if these floors are made 0.2 meters thick, the midafternoon heating of the bottom of the slabs produces a maximum heat release on the topside about dawn the next day when heat is usually most needed. In the preferred embodiment this heat sink is in part provided by the tank 156. The latter is filled with a heat absorbing fluid such as water or the like. It is preferred that the fluid completely fill the tank 156 since an air gap would act as a heat insulator and thus inhibit heat flow between the floor 146a and the fluid in the tank. An expansion tank 158 is preferably provided on the bottom floor which is in fluid contact with the tank 156 to hold the overflow from the latter. A pipe 157 is also provided wherein one end is placed near the bottom of the tank 156 and the other is placed in the bottom of the expansion tank 158. Since the coolest portion of the fluid is on the bottom of the tank 156, this portion will flow through pipe 157 into the expansion tank 158 when the fluid expands from heat input and fluid will flow back through pipe 157 into the tank 156 from tank 158 when fluid in tank 156 contracts. This structure utilizes the physical properties of water to maintain deaireation. However, a float or needle valve 160 may further be provided to let air out in order that the fluid will come into contact with the top of tank 156 when the latter is filled. If desired, the heat "storing" capabilities of the tank can be improved by making the bottom floor 146a transmissive to the visible and near infrared and the bottom of the tank radiant heat energy absorptive, in which case the pipe 157 and expansion tank may be eliminated and tank 156 need not be completely filled with fluid. Tubing 159 is connected from the tank 156 to a compressor 161. Tubing 159 is coiled in the fluid of tank 156 so as to provide an evaporator during warm weather and a condensor during cold weather. The compressor 161 is also connected to heat exchanger 163. The latter is attached to or secured in the top ceiling 144a. Tubing 157 and exchanger 163 function to provide heat to the tank 156 in the winter and carry heat from tank 156 in the summer. The heat exchanger 163 forms part of the heating and ventillation system which also includes blower 165 which is connected to the exterior portion of the building through pipe 167.

In order to preheat and humidify incoming air by using natural resources, a pipe 162 is installed adjacent the footings of the building below the frost line, around the entire perimeter thereof. Apertures 164 are provided all around the pipe 162 so that air can be introduced into the pipe. Pipe 162 is preferably connected to the inside of the building by pipe 166. Pipe 162 is covered with pea stone 168 which in turn is covered with sand 170. Small glass panels 171 are positioned on the underside of the lowest sill 26a. Panels 171 are preferably tilted at about an 10° angle with respect to the vertical so as to trap insolation and add to the heat content of air entering pipe 162.

Figure 6B:
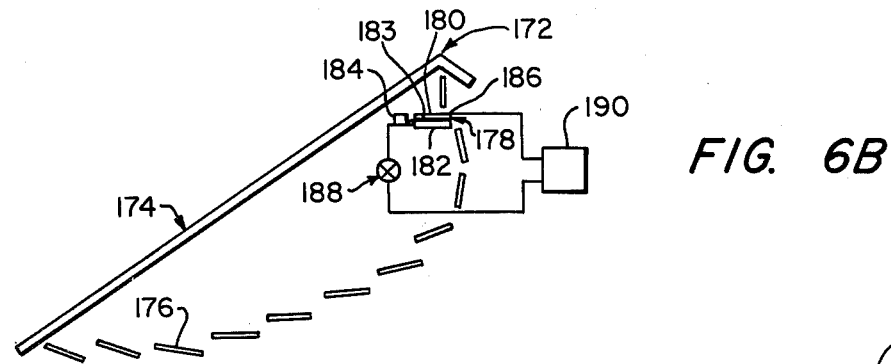
FIG. 6B shows another embodiment of an auxilliary heating system which can further be used in accordance with the teachings of the present invention.
Figure 6A:
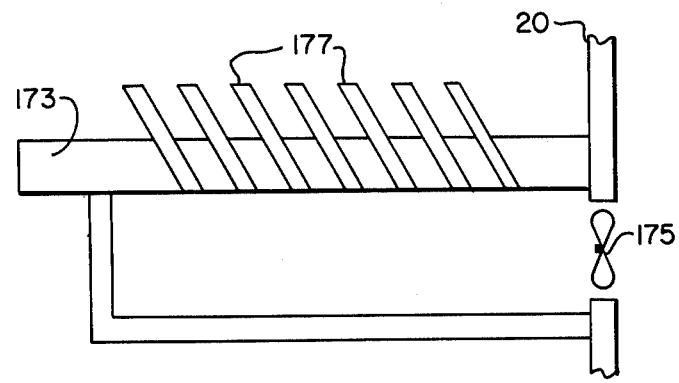
FIG. 6A shows an embodiment of an auxilliary heating system which can further be used in accordance with the teachings of the present invention.

Referring to FIG. 6A, any open floored area outside the building such as the floor of a porch 173, can be used as an auxilliary collector by making it slotted with a plenum underneath. A blower 175 draws heat, absorbed by the floor and conveyed into the surrounding air, into the building. The external floor surface is preferably a grating comprising a plurality of parallel disposed strips 177 which are of spaced closely together. For example, where the strips are thick enough to maintain rigidity, they may be spaced only by a few millimeters apart. The top edges of the strips are heat absorptive while the side edges are heat reflective to increase the heat transfer efficiency. The greatest heat transfer efficiency is achieved when the strips are all tilted about 60° from the vertical toward the south.

A second auxiliary system for trapping insolation is shown in FIG. 6B. This system is installed in the roof 172 having roof panels 174 exposed to solar radiation which are substantially transmissive to light and heat energy. Planar reflectors 176 are positioned in the roof to reflect the heat transmitted by the panels 174 to the tank 178. The tank 178, forms part of a closed water heating system. The top and bottom surfaces 180 and 182 of tank 178 are made of a radiant heat transmissive material such as glass. A radiant heat absorbing grid mesh 183 is positioned in the tank which is spaced from and substantially parallel to surfaces 180 and 182. The water is introduced through control valve 188 into the bottom of tank 178 through nozzle 184 so that the water flow is initially parallel to the bottom surface 182. The water level is provided above the mesh 183 but below surface 180. The grid 183 level relative to the bottom plate 182 is determined by the amount of insolation designed to be concentrated onto the grid. The desired separation varies inversely as the average concentration. For example, at an average concentration of two kilowatts per square meter, the separation should be about 45 mm. The generated steam exits through the tube or pipe 186 positioned at the top of the tank where it is directed to a device for converting the steam into useful energy. For example, device 190 may be radiators on the opposite side of the building, a steam engine or an absorption cycle heat pump.

The operation of the heating and ventillation system will now be described. Generally, the system is designed to automatically provide solar energy into the building from the sun when certain conditions exist and converse heat in the building when other conditions exist. The conditions under which solar energy is to be received or conserved is generally a function of three variables. The first of the variables results from seasonal fluctuations, i.e., whether it is winter (generally designated hereinafter as W) or summer (generally designated hereinafter as $\overline{W}$). The second variable is dependent on the outside temperature, i.e. whether it is cold enough to desire solar energy for heating purposes. Generally, during cold weather when the temperature is below some predetermined value, (the condition which will be designated C) the foils 36 and 38 should be open or retracted during times when it is desired to heat the building with solar energy. However, during hot weather (generally hereinafter designated as $\overline{C}$) it is desired to have the foils closed or in the extended position. Finally, a third variable is determined by the amount of insolation, or the amount of energy being received from the sun. When the sun is shining (a condition which will be herein referred to as G) energy is being received. However, when the sun is not shining, either because it is overcast or it is night, little or no energy is being received (generally hereinafter referred to as $\overline{G}$). Taking into consideration these three variables there are three situations in which it is desired to have the foils 36 and 38 in the retracted or open position wherein the windows will allow solar energy to pass therethrough. The first of these situations is where solar energy is being received from the sun during the winter when it is cold. This can be referred to as the GWC situation. The second situation is where there is little or no solar energy being received during the summer months, i.e. the $\overline{GW}$ situation. In this situation it is desirable to have the foils 36 and 38 retracted so that the windows serve to let light in. The third situation arises when it is warm outside during the winter months, i.e. hereinafter referred to as the W$\overline{C}$ situation, when it is desirous to have the foils retracted to allow the windows to let light and some heat in.

Generally, the three variables C, W and G can be determined by the measurement of three temperatures, i.e. the temperature exterior of the building, the differential rise in temperature resulting from insolation received within the window, and the interior temperature of the building. These three temperatures are measured by the heat sensing elements 62, 64 and 66, respectively. Referring again to FIG. 5, since the resistors 76, 78 and 80 bias sensing diodes 62, 64 and 66, the three corresponding temperatures sensed which are representative of the exterior temperature, insolation and interior temperature is transformed into three corresponding electrical potentials across the respective resistors.

By properly choosing the value of resistors, 124, 126, 128, 129, 131 and 133 a high or low logic signal can be provided at the output of amplifier 86 which is indicative of the C or $\overline{C}$ condition depending on whether the exterior temperature is below or above some predetermined value, for example 15° C. Where the exterior temperature is above this predetermined value, the potential across the temperature sensing element 62 is less than the potential across resistor 133. Thus, the potential at the direct input terminal of operational amplifier 86 is greater than the potential at the inverting input of the amplifier. The output of the amplifier 86 will thus go positive or high which is inverted through inverting gate 106 to indicate the warm or $\overline{C}$ condition. As the exterior temperature falls below the predetermined value, the potential across sensing element 62 increases above the potential across the resistor 133. In this case the input at the inverting input terminal exceeds the potential at the direct input terminal of the operational amplifier 86. The output of the amplifier 86 thus goes negative or low which is inverted through inverting gate 106 to indicate the C condition.

The operational amplifier 84 is used to indicate the summer and winter conditions, $\overline{W}$ and W, respectively. The potential at the direct input terminal of the amplifier 84 is determined by the potential across the resistors 131 and 133. The potential at the inverting input terminal is determined by the potential difference provided on one side of the terminal by the resistor 94 and element 66 (the latter varying inversely with the interior temperature sensed by it) and on the other side by resistor 96 and element 62 (the latter varying inversely with the exterior temperature sensed by it. As the inside temperature sensed by element 66 varies, the potential across resistor 80 varies which varies the potential at the inverting input of amplfier 84. Similarly, as the outside temperataure sensed by element 62 varies, the potential across resistor 76 varies which also varies the potential at the inverting input terminal of amplifier 84. During summer conditions, the potential at the positive input terminal of the amplifier 84 exceeds the potential at the negative or inverting input terminal of the same. Thus, the output of the amplifier 84 will go high which is inverted through the inverting gate 104 and indicates the summer conditions $\overline{W}$. As winter conditions approach, however, the input to the negative or inverting input terminal of amplifier 84 will rise so as to exceed the potential at the positive input terminal of the amplifier. The output of amplifier 84 will thus go low which is inverted through inverting gate 104 and indicates the winter condition W. The feedback capacitor 112 is provided in order to integrate the output of amplifier 84 and together with resistors 94 and 96 introduce a large time constant. This large time constant is provided so that the output of the amplifier will change with seasonal fluctuations and not just unusual weather conditions.

Finally, the operational amplifier 82 determines the condition which may be referred to as heat gain, i.e. when the amount of heat entering the building through a window is greater than the amount of heat lost through that window. Usually, there is a temperature difference between the interior and exterior portions of the building and hence a temperature gradient across the window. The element 64 positioned in the window measures the temperature of the gradient at that ont plus the temperature rise from the energy of insolation. Thus, a heat gain condition exists generally, when the temperature measured at element 64 exceeds the value of the temperature gradient at that point by a predetermined amount, the latter being dependent on various construction factors. During warm weather it is desirable to lose heat from the interior of the building while in cold weather it is desirable to gain heat. Generally, heat gain (G) can be defined as follows:

$$D = K\left(S - \frac{mE + nI}{m + n}\right) = k(I - E) \quad (1)$$

where K, m, n and k are all constants, E is the temperature measured by element 62; S is the temperature measured by element 64 and I is the temperature measured by element 66. Rearranging equation (1), $$-K\left(\frac{m}{m+n} - \frac{k}{K}\right)E - \left(\frac{n}{m+n} + k\right)I = -KS + G \quad (2)$$

Referring to FIG. 5, it will be seen that the negative input terminal of amplifier 82 measures the terms on the left side of the equation (2) and the positive input terminal measures the terms on the right side of the same equation. The positive or direct input of the amplifier 82 is connected between the voltage divider formed by resistors 92 and 114. The potential applied to resistor 114 is dependent on the output of gate 105 which inverts the output of inverting gate 104. Thus the voltage across resistor 92 is dependent on whether the output of amplifier 84 is nearer the high or low state, or more specifically, that summer or winter conditions exist. Preferably, the value of resistor 114 is much greater than that of resistor 92 since it is desirable that the summer or winter conditions have a small effect on the positive or direction out of amplifier 82. The resistors 76, 78, 80, 88, 90 and 92 are chosen so that during the winter, the G condition exists if there is a net heat gain. The values required for this in summer would be rather different. to avoid having to switch resistors, a threshold is added by the potential division of resistor 114 and 92. A small variable amount of heat gain is thus permitted in the summer as being preferable to the more complicated circuits required to avoid it. The negative or inverting input of amplifier 82 is connected to a voltage divider, the latter comprising on one side resistor 88 and on the other side resistor 90. Since resistor 80 provides a potential which is representative of the inside temperataure and resistor 76 provides a potential value which is representative of the exterior temperature; by choosing the proper values of resistors 88 and 90, the potential at the inverting terminal of amplifier 82 will be representative of the temperature at the location of element 64 when heat gain is equal to heat loss. Thus, as the temperature at element 64 rises, the potential at the positive input terminal of amplifier 82 drops and the output of the amplifier goes low. This low or zero signal is inverted by the gate 98 to provide a heat gain signal G which is in the high state. However, where the heat gain drops to zero or where there is a net heat loss, the potential of the positive or direct terminal of amplifier 82 is greater than that of the negative or inverting terminal and the output of amplifier 82 goes high. This output is inverted by gates 98 to provide a low signal G to indicate a zero net heat gain or a heat loss.

Thus, the three variables of whether it is cold, winter, or whether there is a net heat gain is provided by the outputs of the amplifiers 86, 84 and 82, respectively. These three outputs are connected to the NAND gates 100, 108 and 110 in a manner so that the latter will determine when the foils 36 and 38 should be retracted and when they should be extended. The GWC situation is provided by the gate 108 since a high output of inverting gate 98 indicates a heat gain by the high signal G, a high output from gate 104 indicates winter conditions by the signal W and a high output from gate 106 indicates the cold condition by the signal C. Since these three outputs are connected to the inputs of NAND gate 108, the latter will provide a low outut only when all the inputs are high.

The second situation $\overline{GW}$, is provided by gate 100 since the output from amplifier 82 is high when there is no heat gain and the output of gate 105 is high when summer conditions exist. Since the outputs of amplifier 82 and gate 105 are connected to the inputs of NAND gate 100, the latter will provide a low output only when all of its inputs are high.

The third situation $\overline{WC}$ is provided by NAND gate 110 since the output of gate 104 will be high during the winter conditions and the output of the amplifier 86 will be high when it is warm. Since the outputs of the gate 104 and amplifier 86 are connected to the inputs of gate 110, the output of gate 110 will go low when all of its inputs are high.

Conversely, when any of the outputs of the gates 100, 108, 110 go to low DC potential or logical mark, the condition exists for the foils to be retracted. This will occur when any of the three situations mentioned above are occuring.

Figure 7:
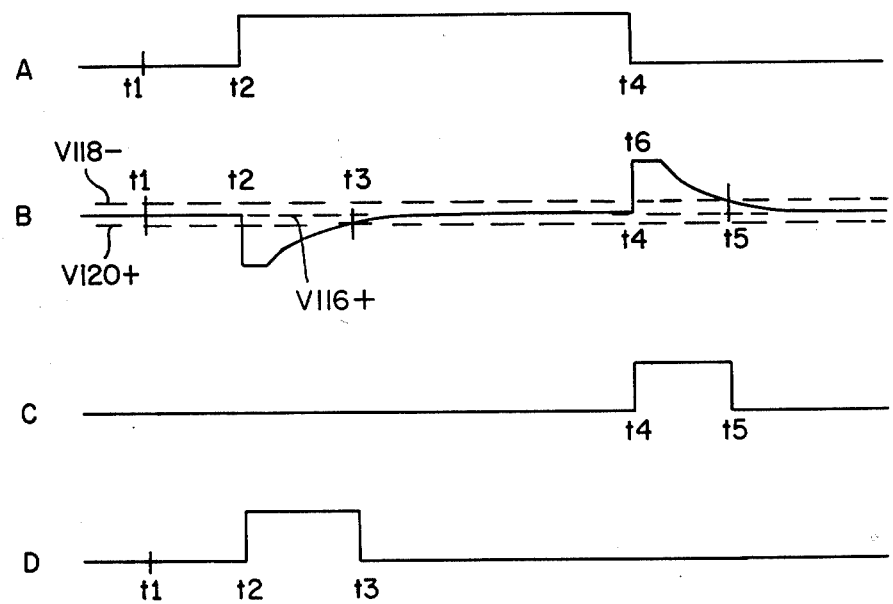
FIG. 7 shows a timing diagram of the operation of the embodiment of FIG. 2.

The output of the three gates 100, 108 and 110 are inverted by NAND gate 102, so that a high DC potential or logical mark signal output is provided to the capacitor 122 when it is desired to lower the foils. The capacitor 122 and resistor 130 serve as a differentiating circuit which controls the potential at the inverting input of amplifier 116. The potential at the positive or direct input of amplifier 116 is fairly constant and is determined by the voltage divider comprising resistors 124 and 126 on one side and resistors 128, 129, 131 and 133 on the other. In the quiescent state the potential at the inputs as well as the output of the amplifier 116 are all approximately at the same level. Referring to FIG. 7B, the output potential of the amplifier 116 in the quiescent state is generally reffered to as $V_{116+}$ to indicate that it seeks the same potential level as the potential at the positive input terminal when it reaches the quiescent state. As shown in FIG. 7, at some time when $t=t_1$, a time in which the output of the amplifier 115 is at its quiescent state, the output potential of amplifier 116 is between the potential applied to the negative or inverting input terminal of amplifier 118 (hereinafter referred to as $V_{118-}$) and the voltage applied to the positive or direct input of the amplifier 120 (hereinafter referred to as $V_{120+}$). This results from the fact that $V_{118-}$ which is the potential drop across resistors 126, 128, 129, 131 and 133 is greater than $V_{116+}$ which is the potential drop across resistors 128, 129, 131 and 133, which in turn is greater than $V_{120+}$ which is the potential drop across resistors 129, 131 and 133. At this time, the output potentials of the amplifiers 118 and 120 are both negative.

At some time $t=t_2$ when it is desirable to retract the foils, the output of gate 102 goes to a high or logical mark (as shown in FIG. 7A). This causes the potential at the negative or inverting terminal of the amplifier 116 to rise above the potential at the positive or direct input of the same amplifier. This will cause the output of amplifier 116 to drop to a low or zero potential output as shown in FIG. 7B. Thus at $t=t_2$ the potential at the direct input terminal of amplifier 118 and the inverting input terminal of amplifier 120 drop to zero. At this point in time the potential at the inverting input of amplifier 118 remains above the potential at the positive input terminal and the output of amplifier 118 remains low or zero, as shown in FIG. 7C. However, when the output of amplifier 116 drops, (and thus the potential at the inverting input terminal of amplifier 120 drops) it falls below $V_{120+}$, as shown in FIG. 7B and the amplifier 120 provides a high or positive output signal (see FIG. 7D). This positive output will drive transistor 134 so that it conducts. When the transistor 134 conducts, the solenoid 61 operates to release the latch 60 allowing the foil to be retracted. Transistor 134 will continue to conduct so long as the output of amplifier 120 is positive. After $t_2$ the output of amplifier 116 will rise above $V_{120+}$ (see FIG. 7B) since the output decays towards it quiescent level. At some time when $t=t_3$ the potential at the inverting input terminal of amplifier 120 rises above the potential at the direct input terminal so that the output of the amplifier goes low or to zero and the transistor 134 is "switched" off so that it no longer conducts. The output of amplifier 116 levels off to its quiescent state and remains there until some time $t=t_4$. At this time conditions exist where it is desirable to extend the foils and the output of gate 102 goes low or to a zero state (see FIG. 7A). The inverting input terminal of the amplifier 116 thus falls below the potential at the positive input terminal and the output of the amplifier will go high (see FIG. 7B). When this occurs, the potential at the direct input terminal of amplifier 118 and the negative input of amplifier 120 also go high. This has no affect on the output of amplifier 120 as shown in FIG. 7B since the potential at the inverting input terminal of amplifier 120 remains above the potential of the direct input. However, as shown in FIG. 7C, a rise in the output of amplifier 116 raises the potential at the positive input terminal fo amplifier 118 above the potential at the inverting input, which in turn causes the output of amplifier 118 to go high. Thus, a positive potential is applied to the base of switching transistor 132, causing the latter to conduct. When the transistor 132 conducts the motor 61 is driven by the battery 70. Motor 61 continues to be driven so long as the output of the amplifier 118 remains high. However, the output decays towards its quiescent level (see FIG. 7B) and at some time when $t=t_5$ the potential at the direct input terminal of the amplifier 118 falls below the potential at its inverting input terminal as the output of the amplifier 116 approaches its quiescent state as shown in FIG. 7B. When this occurs, the output of amplifier 118 goes low or to its zero state as shown in FIG. 7C. This will switch off the transistor 132 and the motor will be deenergized. It should be appreciated that by properly choosing the values of the gain of amplifier 116, resistors 124, 126, 128, 129, 130, 131 and 133, and the capacitor 122, different delays can be provided until the recrossing thresholds are reached. These delays will provide sufficient time to allow the window foils to be lowered between the times $t_2$ and $t_3$ and the foils to be raised between the times $t_4$ and $t_5$.

Thus, the foils 36 and 38 can be raised and lowered automatically depending upon the winter-summer, cold-warm and heat gain or loss variables. During the GWC situation, when it is desirable to utilize the insolation received to heat the interior of the building, the foils will be down and the energy will be transmitted through the glazed panels 22 and 24 whereupon it will strike each floor 146. The visible and near infrared energy of the insolation absorbed will be mostly conducted to the floor 146 only a small portion of which will be reradiated as energy in the far infrared region of the electromagnetic spectrum. Insolation energy will also be transferred from the floor 146 into the fluid in tank 156.

On days of exceptionally high insolation, the curtains 140 are drawn. During cold days when the curtain is drawn the warm air moving up both sides of curtain 140 will move along the underside of ceiling 144, where heat is transferred from the air to the ceiling. Fans 150, may be used to aid the transfer. The cool air returns along the floor and enters the space between the curtain 140 and panel 22. Since the curtain 140 and panel 22 are spaced to minimize motion of air adjacent the panel 22, the air passing between the panel and the curtain will be heated by heat transfer from the curtain with a minimum heat loss to the panel. Heat is stored in the ceiling during the day. During this time panels 148 may be pivoted to their closed position so as to substantially block heat transfer from the ceiling into the room. The heat stored in the ceiling during this time is transferred to the top of the slab 146 by the next morning. The remainder of the stored heat can be released directly into the room below either by natural heat convection or thermostatically by opening the panels 148. When the sun is not housing, the foils will be extended, thus blocking the transfer of heat through the window. As the interior begins to cool the heat absorbed in the floors will be convected and reradiated into the rooms, to provide heat.

During winter, the blower 165 is operated to provide a lower pressure along the interior of the glazed panel 22 with respect to the exterior pressure. This will draw air from the exterior of the building through the slots 34 and groove 33 of each exterior batten 30, through the filtering material 32, and into the space between panels 22 and 24. When the foils are retracted, the incoming air will pass directly through the interior material 32 and out through the groove 33 and slots 34 of the interior batten 30. However, when the foils are extended, the incoming air will first flow vertically along the front of the foil 36, vertically through spacing 46 and out the inner batten 30. thus, laminar flow of air is provided across the foils 36 and 38 when the latter are in the extended position. This flow of incoming air is thus heated by the heat energy reaching the window and the foils from the interior of the building or from the sun. The heat loss is greatly reduced and the incoming ventilation is warmed.

Further, the low pressure created by the blower 165 will also draw air from the exterior portion of the building, through the sand 170 and peastone 168 where the incoming air increases in relative humidity, through the aperture 164 into pipe 162 and pipe 166, and thence into the building.

The blower exhausts the stale air through the vent pipe 167. To conserve heat on very cold days the ventilation rate is reduced and heat exchanger 163 is used to recover heat from the stale air before exhaust. It is transferred by the heat pump 161. Such recovered heat can be transferred to the tank 156 via the coil 159. In extremely hot weather, the heat pump is reversed.

If desired, the auxiliary heating systems provided by roof tank 178 and the porch 173 may also be utilized. When it is desirable to use the roof system, the water is introduced into nozzle 184 at a predetermined flow rate which is controlled by valve 188 in order that the water flow in the tank is laminar in nature. The flow rate is such that the water rises at approximately the same rate as the heat conducted from the gird mesh 183 moves downwardly. This provides an efficient heating system in which the water in the tank is heated to the boiling point upon reaching the grid 183 whereupon it can be transmitted to device 190 through appropriate pipes. When the auxiliary heating system which includes the porch 173 is utilized, the blower 175 is operated so that air is drawn through the strips 177 into the plenum therebelow, whereupon it is drawn into the building.

During the summer, when it is desired to block external heat from entering the building, the blower 165 is driven in the opposite direction to create a higher pressure along the interior of the panel 22. In this case, the air will pass through the interior batten 30, through the window and out through the exterior batten. This air wash is warmed by the heat that has reached the glass and foils, thus carrying the heat received back outside and keeping the interior cool.

A ventilation and humidification system is thus provided, which is independent of whether the foils 36 and 38 are in the retracted or extended positions. The system also insures that the air within the glazing is always above its dew point so that no condensation occurs.

Since certain changes may be made in the above apparatus without departing from the scope of the invention herein involved, it is intended that all matter contained in the above description or shown in the accompanying drawing shall be interpreted in an illustrative and not in a limiting sense.

What is claimed is:

1. For use in an enclosed structure having a ceiling, a transparent window transmissive to light and sun energy and mounted in a wall of said structure, and a floor, an assembly comprising, in combination:
    a sheet of material absorptive to said light and sun energy and reflective to heat provided in said structure;
    means for mounting said sheet within said structure parallel to and spaced from the adjacent surface of said window so as to provide a space between said sheet and each of said window, ceiling and floor;
    means spaced from said ceiling for guiding air along the underside of said ceiling and comprising a plurality of panels pivotal between a closed position wherein said panels are spaced from said ceiling and substantially coplanar with one another so that a path is provided for the guided air between said ceilingand said panels, and an open position wherein said panels are parallel but spaced from one another so as to expose radiation from said ceiling to the interior of said enclosure; and
    means for drawing air through the space between said window and said sheet so as to heat said air and for drawing air along the underside of said ceiling;
    wherein said sheet is spaced from said window such that air along said adjacent surface is substantially stagnant while air drawn by said means for drawing air, draws air between the substantially stagnant air and said sheet.

2. The assembly according to claim 1, wherein said sheet comprises a first material transmissive to said heat provided in said enclosure and small grains of a material disposed within said first material and absorptive to said light and sun energy and reflective to said heat provided in said structure.

3. An assembly in accordance with claim 2 wherein the material of said grains is selected from the group consisting of silicon, germanium, thallium bromide-iodide or any combination thereof.

4. The assembly in accordance with claim 3 wherein said sheet is between 25 and 100 micrometers thick and said grains are each between 5 and 25 micrometers in diameter.

5. The assembly according to claim 2, wherein said first material is cellophane.

6. The assembly according to claim 1, wherein said means for drawing air includes a fan.

* * * * *